Oct. 28, 1947. G. U. HOPTON 2,429,759
PREPARATION OF REAGENTS FOR THE PURIFICATION OF GASES
Filed Feb. 10, 1944
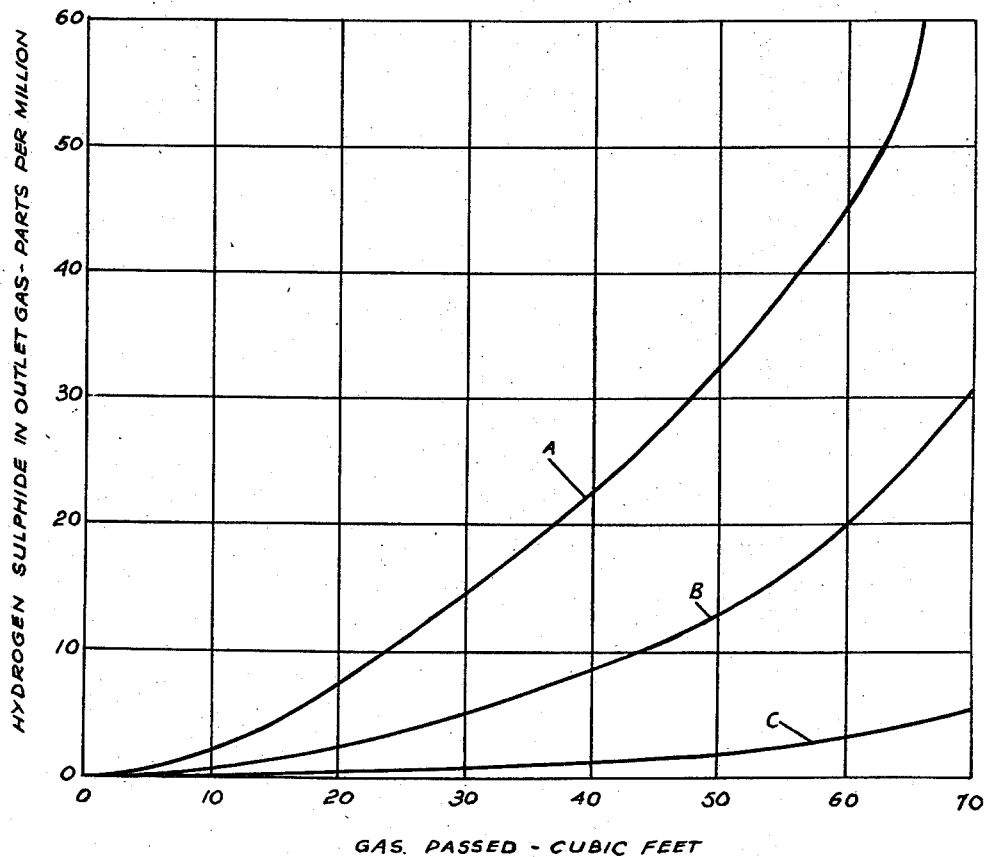
Inventor
G. U. HOPTON Patented Oct. 28, 1947

2,429,759

UNITED STATES PATENT OFFICE 2,429,759

PREPARATION OF REAGENTS FOR THE PURIFICATION OF GASES

Gerald Uern Hopton, London, England, assignor to The Gas Light and Coke Company, London, England, a company of Great Britain Application February 10, 1944, Serial No. 521,884
In Great Britain February 10, 1943

19 Claims. (Cl. 252—191)

This invention relates to the production of reagents in granular form for the removal of hydrogen sulphide from gases, and especially the removal of hydrogen sulphide in those cases where a high degree of purity is required in the gas, such as in town gas or gases required for the purpose of synthesis. The invention is also particularly applicable to the preparation of reagents for removing small quantities of hydrogen sulphide from gases such as those leaving a catalytic plant, in which organic sulphur compounds and nitric oxide are removed from gas, or for the treatment of gas during peak load periods.

In the purification of gases by the removal of hydrogen sulphide by means of iron oxide, it is the usual practice to employ masses containing particles ranging in size from fine dust to coarse lumps. The irregularity in the size of the pieces gives rise to irregular flow of gas through the mass, and high resistance to the passage of the gas. As a result, the velocity of flow of the gas has to be kept low and a large plant is required, while the handling of the material is costly and unpleasant.

Various proposals have been made to overcome these objections by employing iron oxide in the form of cakes or other shaped bodies. Examples of these proposals include the mixing of pastes of hydrated iron oxide with hydraulic binding agents and bicarbonate of an alkali metal or ammonium, heating the mixture and cutting the product into pieces. Again, it has been suggested to make porous moulded bodies by mixing iron oxide with a binder, such as sulphite liquor, water glass, or cement, and organic matter or readily decomposable salts to increase the porosity of the bodies on heating. Another proposal consists in intimately mixing and sintering an iron-bearing substance and an alkaline material so as to form an alkaline ferrite, and treating with water to form insoluble ferric oxide and leaching out the soluble compound. It has also been proposed to prepare purifying masses by adding a slow-acting agglomerant to iron oxide and sawdust, and yet again, by mixing iron oxide with hydraulic binding agents, water and incombustible fibrous materials capable of swelling in the presence of water to form a porous structure.

It has now been found that an active form of porous granular reagent can be obtained by precipitating the iron oxide in the wet way, and according to the invention, such masses are formed by setting up a reaction between a suitable iron compound and an alkali or alkaline earth hydroxide, oxide, carbonate or bicarbonate. It is preferred to use ferrous sulphate with calcium hydroxide because the setting properties of calcium sulphate formed can be used in obtaining masses of the required consistency, but even in that case cement may be added if a harder product is required. It is necessary to add cement if one of the reagents is an alkali carbonate or bicarbonate in order to produce a material which will withstand the action of water.

The preferred method of producing the purifying mass according to the invention, consists in using dry copperas ($FeSO_4.7H_2O$) and dry slaked lime ($Ca(OH)_2$) as the reagents, and to mix them and then roll them in a slowly rotating sloping drum while sprinkling with a fine spray of water.

The copperas and slaked lime should be free from moisture because otherwise they will begin to react almost directly they are mixed, and the partly gelatinous material so formed will not readily roll into pellets in the drum, and the pellets formed will be dense and insufficiently porous. On the other hand, if the copperas contains no water other than water of crystallisation, and the lime contains no water other than that combined as hydroxide, or even less than is sufficient for complete slaking, the mixed powder is relatively stable and may be kept for some hours without reacting. If such dry mixed powder is fed into a drum and sprinkled with a fine spray of water, pellets are formed which are light and porous. It is also advantageous to work with a shallow layer of material in the rotating drum, so as to avoid compaction due to the weight of material present.

In order that the most effective method of carrying out the invention may be clearly understood, the above results will be elaborated with reference to the accompanying drawing which consists of a set of graphs giving the results of laboratory tests on three types of material. In all cases, 500 cc. of pellets, contained in a glass tube 32 mm. in diameter, were fouled with coal gas containing 420 grains of hydrogen sulphide per 100 cubic feet, at the rate of 10 cubic feet per hour. The graphs show the concentration of hydrogen sulphide in the gas leaving the pellets in relation to the volume of gas passed. In the first run represented by curve A, the copperas and lime were commercial samples which were moist; the copperas gave a loss on ignition of 73.5% whereas pure $FeSO_4.7H_2O$ gives a loss of 71.2%; the lime gave a loss on ignition of 24.1%, whereas pure Ca(OH)$_2$ gives a loss of 24.3%. Thus the copperas was too moist, although the lime was very slightly under-slaked. In the second run illustrated by curve B, pure FeSO$_4$.7H$_2$O and pure Ca(OH)$_2$ were used. In the third run shown by curve C, specially dried materials were used; the copperas gave a loss on ignition of only 70.0% and lime a loss on ignition of 22.9%.

In the drawing, it will be observed that the volume of gas passed in each case is plotted in cubic feet horizontally while the amount of hydrogen sulphide retained in the outflowing gas in parts per million is plotted vertically. From a comparison of the decreasing slopes of the curves A, B and C, the beneficial effect of using dried materials is clearly apparent. It should be noted that the results refer to laboratory tests on a shallow bed of pellets, and do not represent the working of a plant with a bed of about 17 feet thickness.

The copperas and lime may conveniently be passed through a one-sixteenth inch sieve. The rate of supplying water to the material being rolled in the drum can be determined by trial. If too much water is added, the material becomes wet and sticky and is difficult to work up into pellets of suitable size; if too little water is added, the pellets are flaky and too weak to withstand sieving or plant handling. If the correct amount of water is added, pellets are obtained from the drum which can be graded for size, small particles being returned to the drum for working up with fresh powder, and large particles being brushed and similarly returned.

When the pellets are dried in contact with the air, the ferrous compound present becomes oxidized to the ferric state and the pellets set firm.

The precautions against excessive moisture in the copperas or lime may be relaxed if the material is to be allowed to set into a cake which is then to be broken up into particles of the desired size, or if the gelatinous product first formed is to be extruded or otherwise moulded into shape before setting.

A freshly-formed product which was satisfactory was found on analysis to contain 27 per cent of moisture, 19.6 per cent of ferric iron, and 0.2 per cent of ferrous iron, with a pH value of 8. The graded pellets were allowed to complete the reaction and to dry in air, when the moisture content fell to 17 per cent. It was also found possible to dry the pellets in a forced current of heated air, when a satisfactory material was obtained although the moisture content was as low as 3 per cent. In all cases, the product was of a sufficiently robust nature to withstand the gas purifying operations, although as already mentioned, cement may be added if required, and it has been found in small scale tests not to reduce the activity of the material.

By an alternative method, calcium carbonate may be used instead of calcium hydroxide, and then the material is particularly porous owing to the evolution of carbon dioxide during the reaction. Alternatively, a mixture of calcium hydroxide and calcium carbonate may be used to react with the ferrous sulphate.

Yet again, a suitable porous granular material may be prepared by using an alkali carbonate or bicarbonate such as sodium carbonate instead of calcium carbonate, and then as there will not be calcium sulphate present to serve as a setting agent, it is necessary to add cement or like material so that the product may withstand the action of water. In such a case also, as there is no question of forming calcium sulphate, other iron compounds than ferrous sulphate may be used as, for example, iron chloride.

As an example of the use of pellets graded $\frac{1}{16}$ to $\frac{3}{8}$ inch in diameter, made by rolling a powder consisting of 75 per cent by weight of copperas and 25 per cent of slaked lime in a drum while sprinkling with water, the following results of a run on a pilot plant are given.

Two towers in series, 2 feet in diameter and containing a total bed 17 feet deep, were charged with 53 cubic feet of pellets weighing 1 ton. Coal gas containing 335 grains of hydrogen sulphide per 100 cubic feet was passed through the towers at the rate of 4,000 cubic feet per hour. The outlet gas was at first completely free from hydrogen sulphide, and after some time, traces of hydrogen sulphide were found, but not until 379,000 cubic feet of gas had been passed did the concentration of hydrogen sulphide in the outlet gas reach 1 part per million by volume. Pellets were then passed down the towers in strict countercurrent movement to the flow of gas, fresh pellets being added from a hopper at the top of the second tower (relative to gas flow), pellets discharged from this tower being transferred to a hopper at the top of the first tower, while part-spent pellets were discharged from the bottom of the first tower. The gas flow was upward in each tower in series, at the rate of 4,000 cubic feet per hour, and the rate of passage of pellets was adjusted so as to effect purification of the gas. A total volume of 28.3 cubic feet of pellets was discharged from the first tower during the passage of 800,000 cubic feet of coal gas, while maintaining the concentration of hydrogen sulphide in the outlet gas at 0.6 part per million. The discharged pellets contained 19.6 per cent of sulphur and 14.0 per cent of moisture.

It is clear that, if required, a still greater degree of purity of the gas could be obtained by a more rapid passage of pellets through the plant, with a smaller content of sulphur in the discharged material. Alternatively and preferably, a deeper bed of material could be used, for the pressure drop across the towers in the above instance was only 2 inches water gauge.

In a second run, designed to test the performance with carburetted water gas and also to demonstrate the use of revivified part-spent pellets, the two towers from the run on coal gas described above were discharged. The part spent pellets ran readily out of the bottom discharge doors, and were allowed to revivify in air. The towers were then re-charged with this material, containing on the average 10 per cent of sulphur and 17 per cent of moisture. Carburetted water gas containing 165 grains of hydrogen sulphide per 100 cubic feet was then passed through the towers at the rate of 4,000 cubic feet per hour. Pellets were then passed down the towers in strict countercurrent movement to the flow of gas at such a rate as to effect purification of the gas, but instead of adding fresh pellets to the top of the second tower (relative to gas flow), revivified part spent pellets which had been discharged during the first run were used. The revivified part-spent pellets fed to the second tower contained 20 per cent of sulphur and 14 per cent of moisture. A total volume of 16.2 cubic feet of pellets was discharged from the first tower during the passage of 660,000 cubic feet of carburetted water gas, while maintaining the concentration of hydrogen sulphide in the outlet gas at 0.4 part per million. The discharged pellets contained 22.3 per cent of sulphur and 15.2 per cent of moisture.

I claim:

1. A method for the production of shaped bodies containing iron oxide for the removal of hydrogen sulphide from gases which comprises the steps of mixing a water-soluble ferrous compound with a compound selected from the group consisting of the hydroxides, oxides, carbonates and bicarbonates of the alkaline earth and alkali metals in the form of dry powders, moistening said compounds with enough water to initiate the reaction between same resulting in a reaction product containing a pasty, gelatinous ferrous compound and simultaneously shaping said reaction product into individual bodies and drying said bodies in the air admixed therewith a setting agent so that the ferrous compound oxidizes to the ferric state to complete the reaction and the bodies set firm.

2. A method for the production of shaped bodies containing iron oxide for the removal of hydrogen sulphide from gases which comprises the steps of mixing ferrous sulphate and calcium hydroxide in the form of dry powders, moistening said compounds with enough water to initiate the reaction between same resulting in a reaction product containing pasty, gelatinous ferrous hydroxide and calcium sulphate and simultaneously shaping said reaction product into individual bodies and drying said bodies in the air while the ferrous hydroxide oxidizes to the ferric state to complete the reaction and the bodies set firm.

3. A method for the production of shaped bodies containing iron oxide for the removal of hydrogen sulphide from gases which comprises the steps of mixing ferrous sulphate and calcium hydroxide in the form of dry powders with the addition of a hydraulic setting agent, moistening said mixture with enough water to initiate the reaction between the ferrous sulphate and the calcium hydroxide resulting in a reaction product containing pasty, gelatinous ferrous hydroxide and simultaneously shaping said reaction product into individual bodies and drying said bodies in the air while the ferrous hydroxide oxidizes to the ferric state to complete the reaction and the bodies set firm.

4. A method for the production of shaped bodies containing iron oxide for the removal of hydrogen sulphide from gases which comprises the steps of mixing ferrous sulphate and calcium hydroxide in the form of dry powders with the addition of a cement, moistening said mixture with enough water to initiate the reaction between the ferrous sulphate and the calcium hydroxide resulting in a reaction product containing pasty, gelatinous ferrous hydroxide and simultaneously shaping said reaction product into individual bodies and drying said bodies in the air while the ferrous hydroxide oxidizes to the ferric state to complete the reaction and the bodies set firm.

5. A method for the production of shaped bodies containing iron oxide for the removal of hydrogen sulphide from gases which comprises the steps of mixing ferrous sulphate and calcium carbonate in the form of dry powders, moistening said compounds with enough water to initiate the reaction between same resulting in a reaction product containing pasty, gelatinous ferrous hydroxide and calcium sulphate and simultaneously shaping said reaction product into individual bodies and drying said bodies in the air while the ferrous hydroxide oxidizes to the ferric state to complete the reaction and the bodies set firm.

6. A method for the production of shaped bodies containing iron oxide for the removal of hydrogen sulphide from gases which comprises the steps of mixing ferrous sulphate and calcium carbonate and calcium hydroxide in the form of dry powders, moistening said compounds with enough water to initiate the reaction between same resulting in a reaction product containing pasty, gelatinous ferrous hydroxide and calcium sulphate and simultaneously shaping said reaction product into individual bodies and drying said bodies in the air while the ferrous hydroxide oxidizes to the ferric state to complete the reaction and the bodies set firm.

7. A method as set forth in claim 1 in which the amounts of the reagent are so selected that the final product has a pH value of approximately 8.

8. A method of the character set forth in claim 2 in which the amounts of the reagent are so selected that the final product has a pH value of approximately 8.

9. A method of the character set forth in claim 5 in which the amounts of the reagent are so selected that the final product has a pH value of approximately 8.

10. A method for the production of shaped bodies containing iron oxide for the removal of hydrogen sulphide from gases which comprises the steps of mixing a water-soluble ferrous compound with a compound selected from the group consisting of the hydroxides, oxides, carbonates and bicarbonates of the alkaline earth and alkali metals in the form of dry powders, moistening said compounds with enough water to initiate the reaction between same resulting in a reaction product containing a pasty, gelatinous ferrous compound, rolling said mixture in a rotating drum admixed with a setting agent in order to shape said reaction product into pellets simultaneously with said moistening, and drying said pellets in the air while the ferrous compound oxidizes to the ferric state to complete the reaction and the pellets set firm.

11. A method for the production of shaped bodies containing iron oxide for the removal of hydrogen sulphide from gases which comprises the steps of mixing ferrous sulphate and calcium hydroxide in the form of dry powders, moistening said compounds with enough water to initiate the reaction between same resulting in a reaction product containing pasty, gelatinous ferrous hydroxide and calcium sulphate, rolling said mixture in a rotating drum admixed with a setting agent in order to shape said reaction product into pellets simultaneously with said moistening, and drying said pellets in the air while the ferrous compound oxidizes to the ferric state to complete the reaction and the pellets set firm.

12. A method for the production of shaped bodies containing iron oxide for the removal of hydrogen sulphide from gases which comprises the steps of mixing ferrous sulphate and calcium carbonate in the form of dry powders, moistening said compounds with enough water to initiate the reaction between same resulting in a reaction product containing pasty, gelatinous ferrous hydroxide and calcium sulphate, rolling said mixture in a rotating drum admixed with a setting agent in order to shape said reaction product into pellets simultaneously with said moistening, and drying said pellets in the air while the ferrous compound oxidizes to the ferric state to complete the reaction and the pellets set firm.

13. A method for the production of shaped bodies containing iron oxide for the removal of hydrogen sulphide from gases which comprises the steps of mixing ferrous sulphate and calcium hydroxide in the form of dry powders with the addition of a hydraulic setting agent, moistening said mixture with enough water to initiate the reaction between the ferrous sulphate and the calcium hydroxide resulting in a reaction product containing pasty, gelatinous ferrous hydroxide, rolling said mixture in a rotating drum admixed with a setting agent in order to shape said reaction product into pellets and drying said pellets simultaneously with said moistening in the air while the ferrous compound oxidizes to the ferric state to complete the reaction and the pellets set firm.

14. A method for the production of shaped bodies containing iron oxide for the removal of hydrogen sulphide from gases which comprises the steps of mixing ferrous sulphate and calcium hydroxide in the form of dry powders with the addition of a cement, moistening said mixture with enough water to initiate the reaction between the ferrous sulphate and the calcium hydroxide resulting in a reaction product containing pasty, gelatinous ferrous hydroxide, rolling said mixture in a rotating drum admixed with a setting agent in order to shape said reaction product into pellets simultaneously with said moistening, and drying said pellets in the air while the ferrous compound oxidizes to the ferric state to complete the reaction and the pellets set firm.

15. A method for the production of shaped bodies containing iron oxide for the removal of hydrogen sulphide from gases which comprises the steps of mixing ferrous sulphate and calcium carbonate and calcium hydroxide in the form of dry powders, moistening said compounds with enough water to initiate the reaction between same resulting in a reaction product containing pasty, gelatinous ferrous hydroxide and calcium sulphate, rolling said mixture in a rotating drum admixed with a setting agent in order to shape said reaction product into pellets simultaneously with said moistening, and drying said pellets in the air while the ferrous compound oxidizes to the ferric state to complete the reaction and the pellets set firm.

16. A method for the production of shaped bodies containing iron oxide for the removal of hydrogen sulphide from gases which comprises the steps of mixing a water-soluble ferrous compound with a compound selected from the group consisting of the hydroxides, oxides, carbonates and bicarbonates of the alkaline earth and alkali metals in the form of dry powders, moistening said compounds with enough water to initiate the reaction between same resulting in a reaction product containing a pasty, gelatinous ferrous compound, molding said wet reaction product into pieces simultaneously with said moistening, and drying said pieces in the air admixed with a setting agent so that the ferrous compound oxidizes to the ferric state to complete the reaction and the pieces set firm.

17. A method for the production of shaped bodies containing iron oxide for the removal of hydrogen sulphide from gases which comprises the steps of mixing a water-soluble ferrous compound with a compound selected from the group consisting of the hydroxides, oxides, carbonates and bicarbonates of the alkaline earth and alkali metals in the form of dry powders, moistening said compounds with enough water to initiate the reaction between same resulting in a reaction product containing a pasty, gelatinous ferrous compound, introducing said wet mixture into a mold so that the reaction will take place therein simultaneously with the shaping thereof, drying the resulting reaction product admixed with a setting agent so that the ferrous compound oxidizes to the ferric state to complete the reaction and the product sets to a firm cake and breaking said cake into pieces of desired size.

18. A method for the production of shaped bodies containing iron oxide for the removal of hydrogen sulphide from gases which comprises the steps of mixing together, in dry powdered form, a water-soluble ferrous compound with a compound selected from the group consisting of the hydroxides, oxides, carbonates and bicarbonates of the alkaline earth and alkali metals, moistening the mixture with enough water to initiate the reaction between the said compounds, shaping the wet mass thus formed and admixed with a setting agent into individual bodies and drying said bodies in the air, so that the ferrous compound oxidizes to the ferric state and the bodies set firm.

19. A method for the production of shaped bodies containing iron oxide for the removal of hydrogen sulphide from gases which comprises the steps of mixing together, in dry powdered form, ferrous sulphate and calcium hydroxide, moistening the mixture with enough water to initiate the reaction between the said two compounds resulting in a reaction product containing ferrous hydroxide and calcium sulphate, shaping the said reaction product while wet and prior to the setting of the calcium sulphate, into individual bodies and drying said bodies in the air so that the ferrous hydroxide oxidizes to the ferric state and the bodies set firm.

GERALD UERN HOPTON.

REFERENCES CITED

The following references are of record in the file of this patent:

UNITED STATES PATENTS

| Number | Name | Date |
| --- | --- | --- |
| 292,341 | McDougall | Jan. 22, 1884 |
| 2,008,953 | Giller et al. | July 23, 1935 |
| 2,131,006 | Dean | Sept. 20, 1938 |
| 2,165,344 | Colton | July 11, 1939 |

FOREIGN PATENTS

| Number | Country | Date |
| --- | --- | --- |
| 22,335 | Great Britain | 1910 |